(12) United States Patent
Kang et al.

(10) Patent No.: US 7,385,658 B2
(45) Date of Patent: Jun. 10, 2008

(54) DUAL DISPLAY MODE LIQUID CRYSTAL DISPLAY DEVICE, COMMUNICATION DEVICE USING THE SAME, AND METHOD OF FABRICATING THE SAME

(75) Inventors: Hoon Kang, Gyeongeongbuk-do (KR); Hyun-Beom Shin, Gyeongeongbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 177 days.

(21) Appl. No.: 10/809,394

(22) Filed: Mar. 26, 2004

(65) Prior Publication Data
US 2004/0189904 A1    Sep. 30, 2004

(30) Foreign Application Priority Data
Mar. 27, 2003   (KR)   ............... 10-2003-0019110

(51) Int. Cl.
*G02F 1/1335* (2006.01)

(52) U.S. Cl. ..................................... 349/114
(58) Field of Classification Search .............. 349/114
See application file for complete search history.

(56) References Cited

U.S. PATENT DOCUMENTS 4,025,161 A * 5/1977 La Roche ................. 349/98
5,790,214 A   8/1998 Park
6,542,208 B1 * 4/2003 Akiyama ................. 349/96
6,801,270 B2 * 10/2004 Faris et al. .............. 349/61
2002/0047958 A1 * 4/2002 Hirata et al. ............. 349/106
2004/0109112 A1 * 6/2004 Yamauchi et al. ........ 349/113

FOREIGN PATENT DOCUMENTS

| JP | 11-7259 | 1/1999 |
| JP | 2002-357825 | * 12/2002 |
| WO | 00/36578 | 6/2000 |

* cited by examiner

*Primary Examiner*—David Nelms
*Assistant Examiner*—Phu Vu
(74) *Attorney, Agent, or Firm*—Morgan, Lewis & Bockius LLP

(57) ABSTRACT

A dual display mode liquid crystal display device includes first and second substrates spaced apart from and facing each other, a first transparent electrode on an inner surface of the first substrate, a second transparent electrode on an inner surface of the second substrate, a liquid crystal layer between the first and second transparent electrodes, a first polarizer on an outer surface of the first substrate, the first polarizer having a first light transmission axis, a front light unit on an outer surface of the first polarizer, a selective reflection/transmission part on an outer surface of the second substrate, the selective reflection/transmission part selectively reflecting linearly polarized light corresponding to the first light transmission axis, and a second polarizer on an outer surface of the selective reflection/transmission part.

42 Claims, 9 Drawing Sheets

[Off State]

[On State]

[Off State]

[On State]

[Off State]

[Off State]

DUAL DISPLAY MODE LIQUID CRYSTAL DISPLAY DEVICE, COMMUNICATION DEVICE USING THE SAME, AND METHOD OF FABRICATING THE SAME

The present application claims the benefit of Korean Patent Application No. P2003-0019110 filed in Korea on Mar. 27, 2003, which is hereby incorporated by reference.

BACKGROUND OF THE INVENTION

1. Field of the Invention

The present invention relates to a liquid crystal display device, and more particularly, to a dual display mode liquid crystal display device, a communication device using a dual display mode liquid crystal display device, and a method of fabricating a liquid crystal display device.

2. Discussion of the Related Art

In general, liquid crystal display (LCD) devices are commonly used in notebook computers and desktop monitors because of their superior resolution, color image display, and image display quality. The LCD devices have first and second substrates that are spaced apart and face each other, wherein an electrode is formed on the opposing interior surfaces of the first and second substrates, and a liquid crystal layer interposed between the first and second substrates. In addition, polarizers are disposed on exterior surfaces of the first and second substrates. Accordingly, when a voltage is supplied to the electrodes of the first and second substrates, alignment of liquid crystal molecules of the liquid crystal layer is changed in order to display images. However, since the LCD devices cannot emit light, an additional light source is necessary in order to display the images. Thus, a backlight device is position behind one of the first and second substrates to irradiate light to the liquid crystal layer, wherein the alignment of the liquid crystal molecules controls the amount of the light that is transmitted through the liquid crystal layer to display the images.

FIGS. 1A and 1B are schematic cross sectional views of a twisted nematic (TN) mode liquid crystal display device according to the related art, wherein FIG. 1A shows progress of light in an OFF state and FIG. 1B shows progress of light in an ON state.

In FIGS. 1A and 1B, first and second substrates 10 and 30 are spaced apart from and face each other, and first and second transparent electrodes 12 and 32 are formed on inner surfaces of the first and second substrates 10 and 30, respectively. In addition, a liquid crystal layer 40 is interposed between the first and second transparent electrodes 12 and 32, first and second polarizers 14 and 34 are disposed on outer surfaces of the first and second substrates 10 and 30, respectively, and a backlight 50 is disposed on a rear surface of the first polarizer 14. The liquid crystal layer 40 operated in a twisted nematic (TN) mode, wherein molecules of the liquid crystal layer 40 are arranged parallel to the inner surfaces of the first and second substrates 10 and 30. Accordingly, as shown in FIG. 1A, the molecules are twisted at right angles between the first and second substrates 10 and 30 when a voltage is not supplied to the first and second transparent electrodes 12 and 32. Conversely, as shown in FIG. 1B, the molecules are arranged perpendicular to the inner surfaces of the first and second substrates 10 and 30 when the voltage is supplied to the first and second transparent electrodes 12 and 32.

In FIGS. 1A and 1B, light transmission axes of the first and second polarizers 14 and 34 cross each other at right angles. In the OFF state, as shown in FIG. 1A, light produced by the backlight devices 50 passes through the first polarizer 14 and is transformed into first linearly polarized light and transmitted through the first substrate 10. Then, the first linearly polarized light is converted into second linearly polarized light while passing the liquid crystal layer 40 due to the right angle twisted of the molecules of the liquid crystal layer 40. Accordingly, the second linearly polarized light is parallel to the light transmission axis of the second polarizer 34. Next, the second linearly polarized light passes through the second polarizer 34 to display a full white image.

In ON state, as shown in FIG. 1B, the light produced by the backlight 50 passes through the first polarizer 14 and is transformed into first linearly polarized light and transmitted through the first substrate 10. Then, the first linearly polarized light passes through the liquid crystal layer 40, wherein the molecules of the liquid crystal layer 40 are arranged perpendicular to the inner surfaces of the first and second substrates 10 and 30, without being further linearly transformed. Since the first linearly polarized light is perpendicular to the light transmission axis of the second polarizer 34, the first linearly polarized light is blocked by the second polarizer 34, thereby displaying a full black image.

According to the related art, the backlight device is used as a light source, and images are displayed only along a single direction.

SUMMARY OF THE INVENTION

Accordingly, the present invention is directed to a dual display mode liquid crystal display device and a communication device using a dual display mode liquid crystal display device that substantially obviates one or more of problems due to limitations and disadvantages of the related art.

An object of the present invention is to provide a dual display mode liquid crystal display device having increased display utilization efficiency.

Another object of the present invention is to provide a communication device using a dual display mode liquid crystal display device having increased display utilization efficiency.

Another object of the present invention is to provide a dual display mode liquid crystal display device having improved brightness and contrast ratios.

Another object of the present invention is to provide a communication device using a dual display mode liquid crystal display device having improved brightness and contrast ratios.

Another object of the present invention is to provide a method of fabricating a liquid crystal display device having increased display utilization efficiency, having improved brightness and contrast ratios, and improved brightness and contrast ratios in a black image.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a dual display mode liquid crystal display device includes first and second substrates spaced apart from and facing each other, a first transparent electrode on an inner surface of the first substrate, a second transparent electrode on an inner surface of the second substrate, a liquid crystal layer between the first and second transparent electrodes, a first polarizer on an outer surface of the first substrate, the first polarizer having a first light transmission axis, a front light unit on an outer surface of the first polarizer, a selective reflection/transmission part on an outer surface of the second substrate, the selective reflection/transmission part selectively reflecting linearly polarized light corresponding to the first light transmission axis, and a second polarizer on an outer surface of the selective reflection/transmission part.

In another aspect, a communication device includes first and second substrates spaced apart from and facing each other, a first transparent electrode on an inner surface of the first substrate, a second transparent electrode on an inner surface of the second substrate, a liquid crystal layer between the first and second transparent electrodes, a first polarizer on an outer surface of the first substrate, the first polarizer having a first light transmission axis, a front light unit on an outer surface of the first polarizer, a selective reflection/transmission part on an outer surface of the second substrate, the selective reflection/transmission part selectively reflecting linearly polarized light corresponding to the first light transmission axis, a second polarizer on an outer surface of the selective reflection/transmission part, and a data entry device adjacent to a second polarizer for inputting data.

In another aspect, a method of fabricating a liquid crystal display device includes forming a first transparent electrode on an inner surface of a first substrate, forming a second transparent electrode on an inner surface of a second substrate, the second substrate facing the first substrate, providing a liquid crystal layer between the first and second transparent electrodes, forming a first polarizer on an outer surface of the first substrate, the first polarizer having a first light transmission axis, providing a front light unit at an outer surface of the first polarizer, forming a selective reflection/transmission part on an outer surface of the second substrate to selectively reflecting linearly polarized light corresponding to the first light transmission axis, and forming a second polarizer on an outer surface of the selective reflection/transmission part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
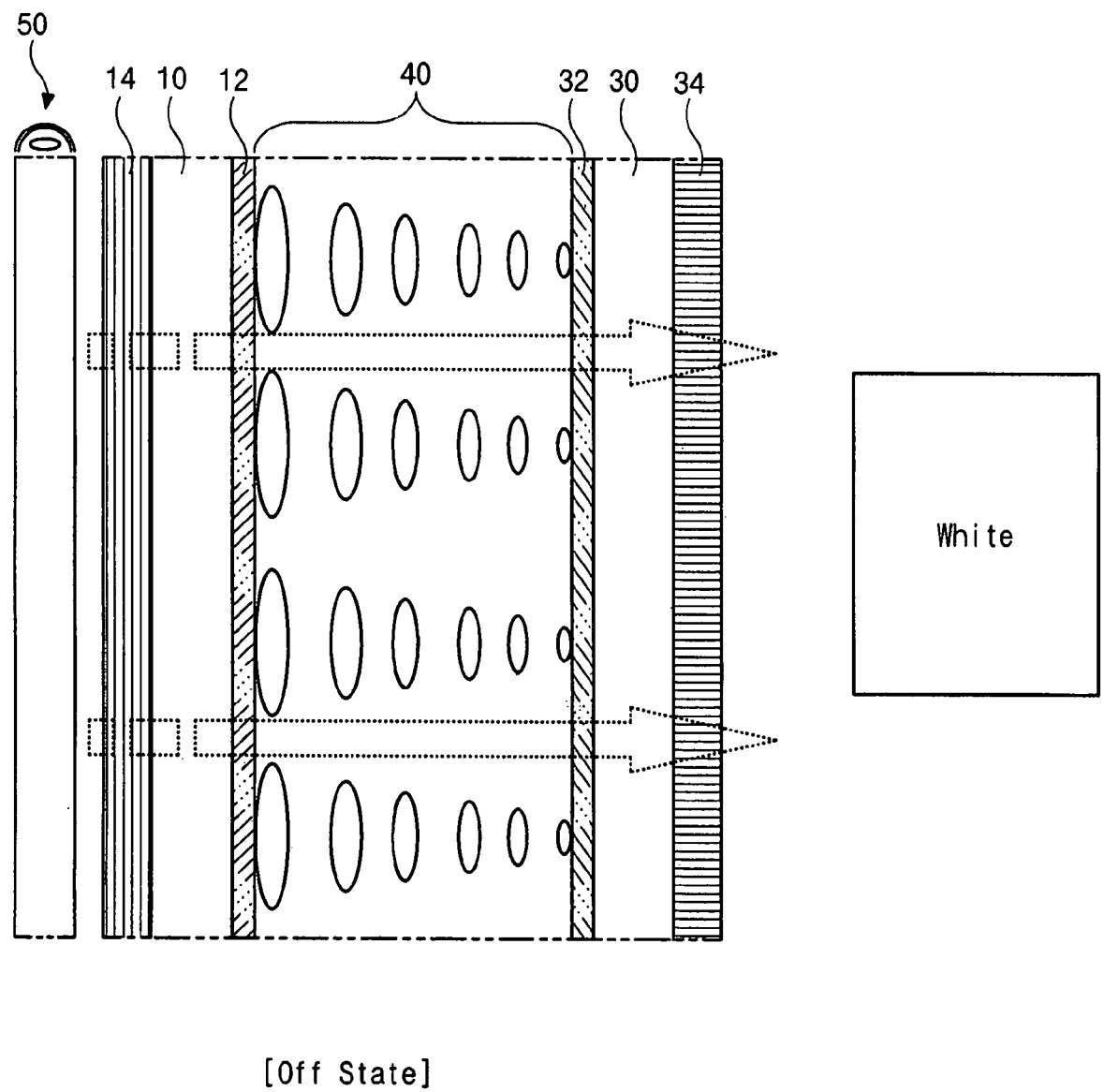
FIGS. 1A and 1B are schematic cross sectional views of a twisted nematic (TN) mode liquid crystal display device according to the related art.
Figure 1B:
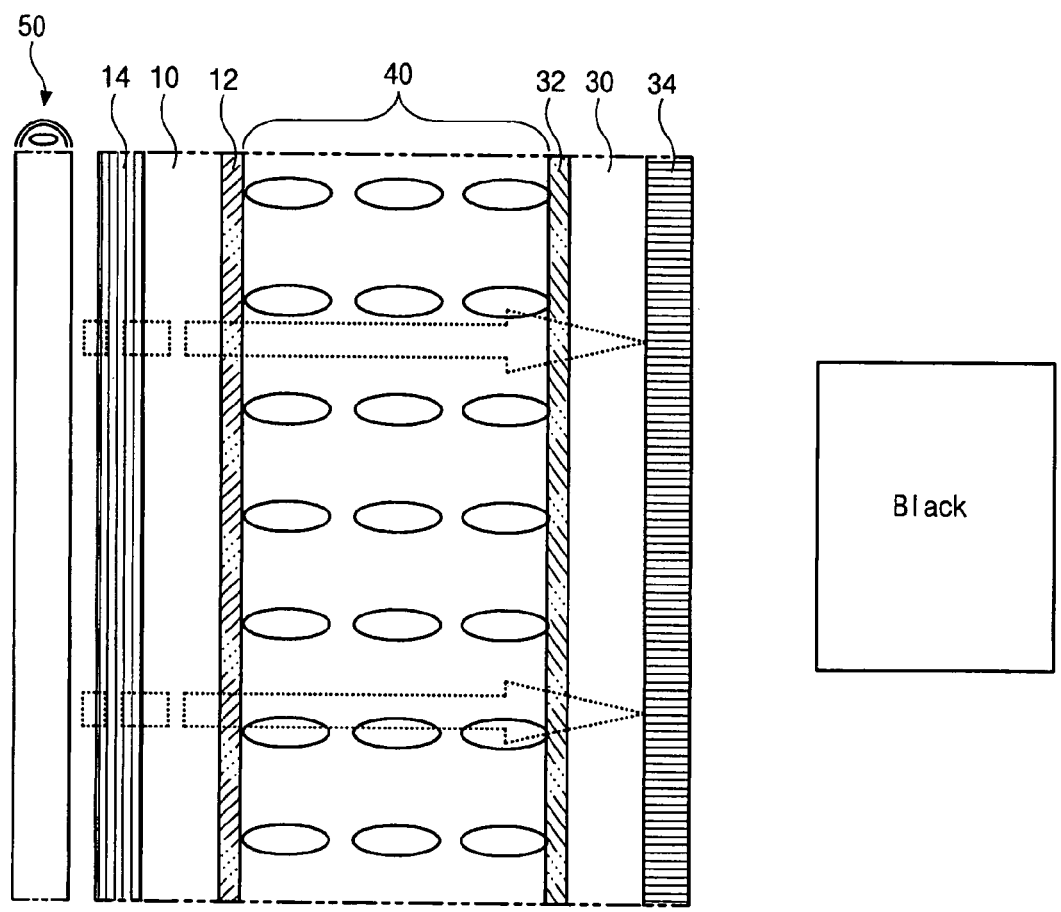
Figure 2A:
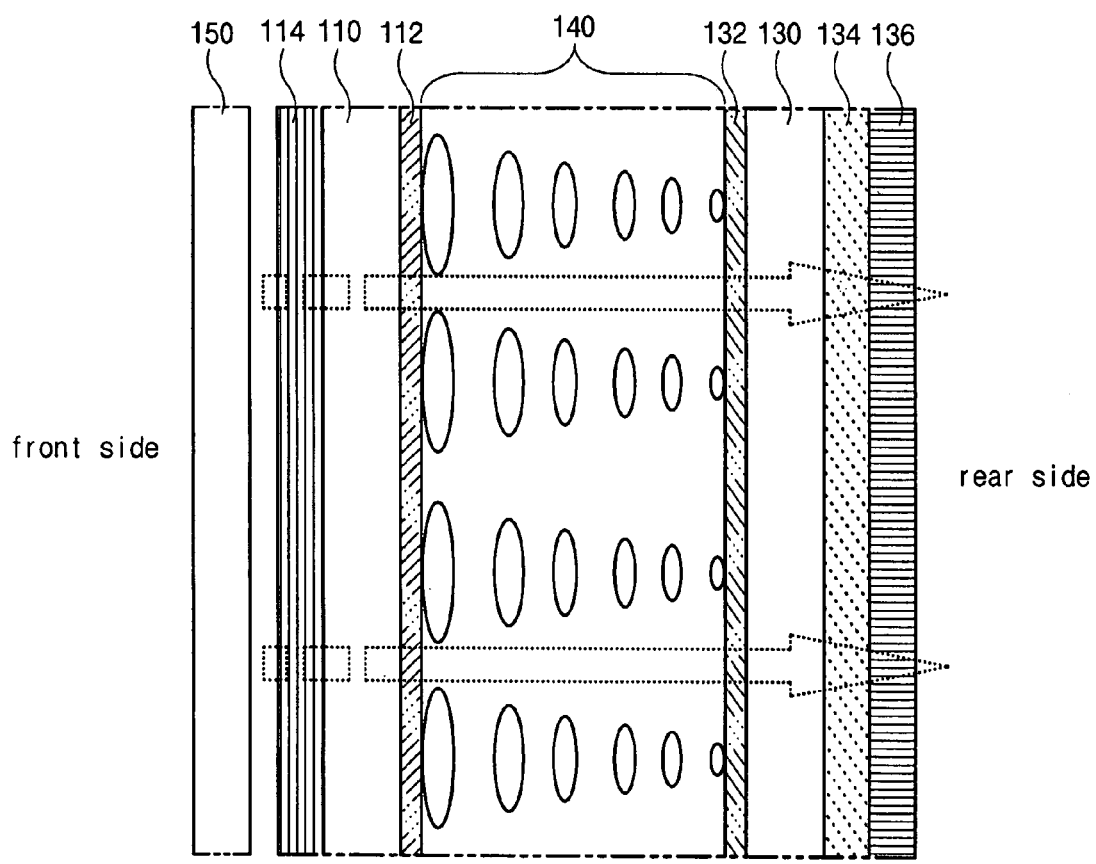
FIGS. 2A and 2B are schematic cross sectional views of an exemplary dual display mode liquid crystal display device according to the present invention.
Figure 2B:
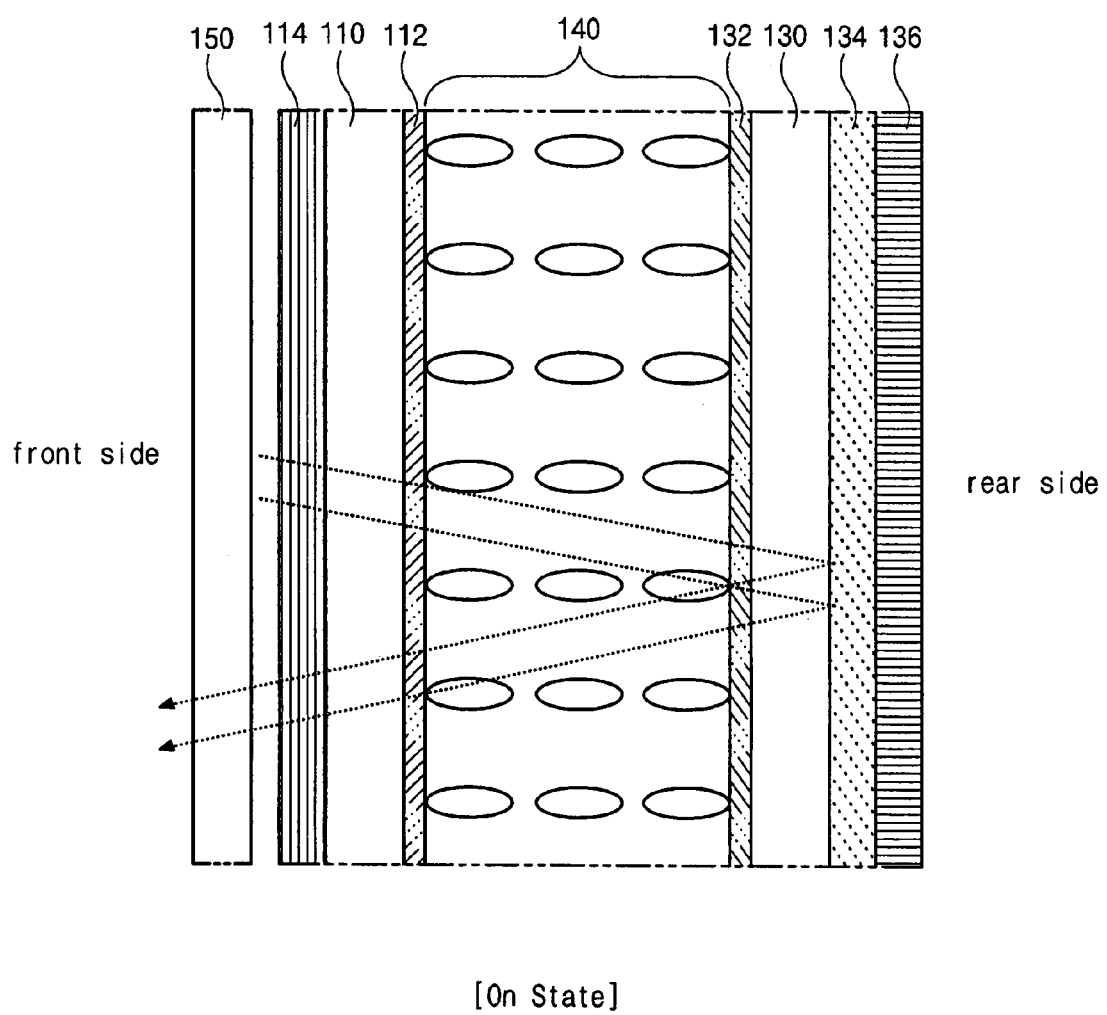

FIGS. 2A and 2B are schematic cross sectional views of an exemplary dual display mode liquid crystal display device according to the present invention, wherein FIG. 2A shows progress of light in an OFF state and FIG. 2B shows progress of light in an ON state.

In FIGS. 2A and 2B, first and second substrates 110 and 130 may be spaced apart from and face each other, and first and second transparent electrodes 112 and 132 may be formed on inner surfaces of the first and second substrates 110 and 130, respectively. In addition, a liquid crystal layer 140 may be interposed between the first and second transparent electrodes 112 and 132, and first and second polarizers 114 and 136 may be disposed on outer surfaces of the first and second substrates 110 and 130, respectively. A front light unit 150 may be disposed on an outer surface of the first polarizer 114 to produce light. The liquid crystal layer 140 may operate in the TN mode, wherein molecules of the liquid crystal layer 140 may be twisted at right angles between the first and second substrates 110 and 130 when a voltage is not supplied to the first and second transparent electrodes 112 and 132. Conversely, as shown in FIG. 2B, the molecules may be arranged perpendicular to the inner surfaces of the first and second substrates 110 and 130 when the voltage is supplied to the first and second transparent electrodes 112 and 132. Alternatively, other operational mode of the liquid crystal layer 140 may be used in the exemplary devices. Although not shown, light transmission axes of the first and second polarizers 114 and 136 may cross each other at right angles.

In FIGS. 2A and 2B, a selective reflection/transmission part 134 may be interposed between the second substrate 130 and the second polarizer 136 to reflect portions of light only parallel to the light transmission axis of the first polarizer 114. The selective reflection/transmission part 134 may include a double brightness enhancement film (DBEF) that selectively reflects light polarized along a predetermined direction. For example, films having refractive indices with respect to X- and Y-axes may be multi-layered such that the refractive indices of the X-axis may be the same and the refractive indices of the Y-axis may be different. Thus, light may be transmitted along the X-axis having the same refractive indices and light may be reflected along the Y-axis having different refractive indices.

In the OFF state, as shown in FIG. 2A, light produced by the front light unit 150 or from an outer light sources (not shown) may pass through the first polarizer 114, thereby transmitting first linearly polarized light to the first substrate 110. Then, the first linearly polarized light may be transformed into second linearly polarized light while passing through the liquid crystal layer 140, which has the molecules twisted at a right angle with respect to the inner surfaces of the first and second substrates 110 and 130. Accordingly, the second linearly polarized light may be parallel to the light transmission axis of the second polarizer 136. Then, the second linearly polarized light may pass through the second polarizer 136 to display a white image. In FIG. 2A, a region where the front light unit 150 is disposed may be referred to as a front side (or a first display side), and an opposite region to the front side may be referred to as a rear side (or a second display side).

According to the present invention, the rear side may be driven as a transmissive mode and the front side may be driven as a reflective mode. Thus, the rear side may have a normally-white mode, in which a white image is displayed when a voltage is not applied to the first and second transparent electrodes 112 and 132, and the front side may have a normally-black mode, in which a black image is displayed when voltage is not applied to the first and second transparent electrodes 112 and 132.

Although not shown, the front light unit 150 may have a patterned structure including saw teeth to condense light toward a direction perpendicular to the first and second substrates 110 and 130. In addition, a lamp of the front light unit 150 may be equipped as an edge-type device.

In the ON state, as shown in FIG. 2B, the light produced by the front light unit 150 or from outer light sources (not shown) may pass through the first polarizer 114, thereby transmitting a first linearly polarized light to the first substrates 110. Then, the first linearly polarized light may pass through the liquid crystal layer 140, which has molecules arranged perpendicular to the inner surfaces of the first and second substrates 110 and 130, without further linearly transforming. Then, the first linearly polarized light may be reflected at the selective reflection/transmission part 134, and may again pass through the liquid crystal layer 140. Next, the first linearly polarized light may be transmitted through the first polarizer 114, thereby displaying a white image on the front side (using the reflective mode). Conversely, a black image is simultaneously displayed on the rear side.

According to the present invention, the front light unit 150 may function like a backlight device to display images on the rear side in the transmissive mode, and light from the front light unit 150 or outer light sources (not shown) may be reflected at the selective reflection/transmission part 134 to display images on the front side in the reflective mode. Thus, the front side and the rear side may both be simultaneously used as display regions to display different images, thereby increasing and display utilization efficiency of the LCD device. In addition, since the outer light sources (not shown) may be used in combination with the front light unit 150, light efficiency may be improved.

Figure 3:
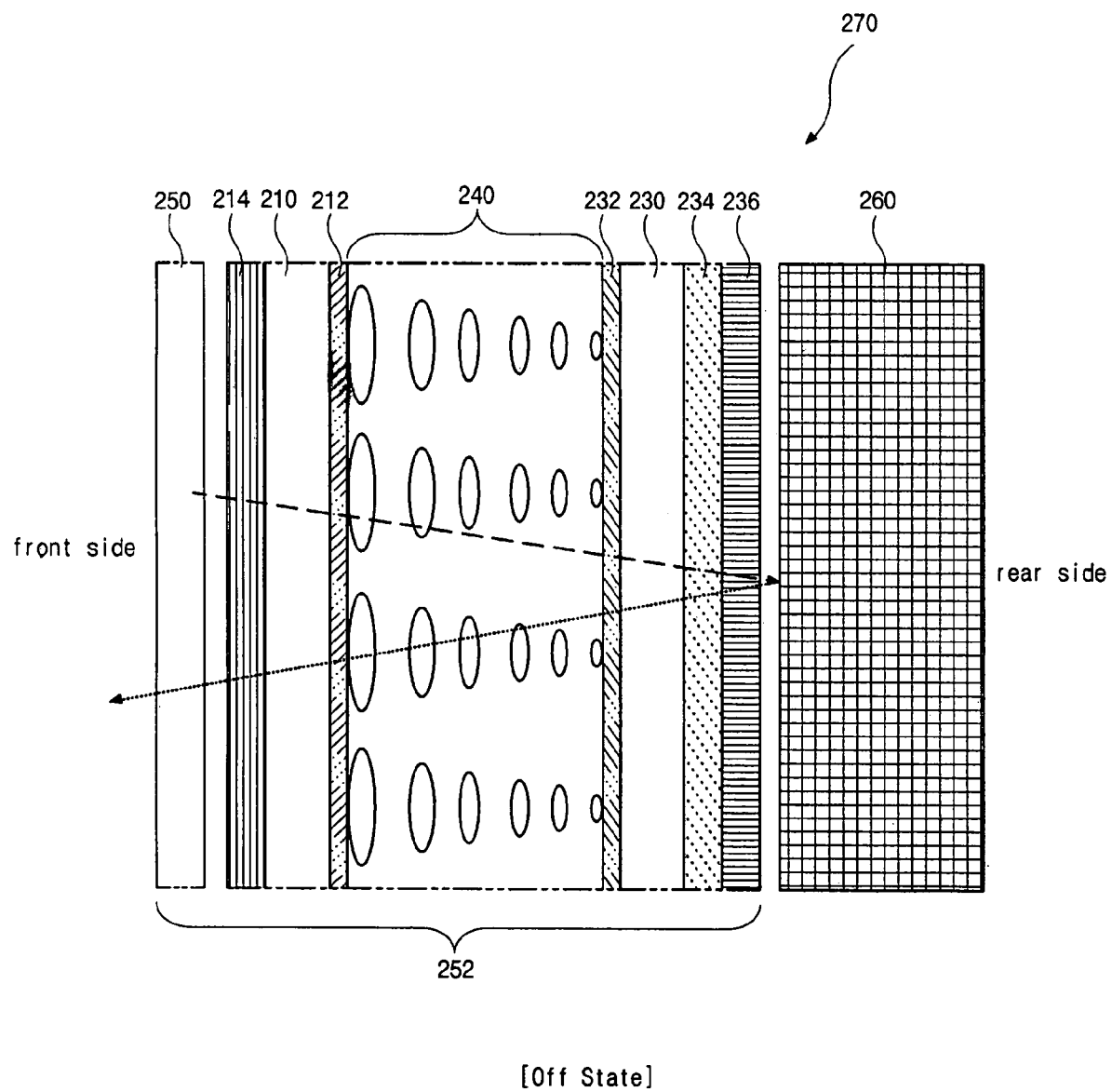
FIG. 3 is a schematic cross sectional view of an exemplary communication device according to the present invention.

FIG. 3 is a schematic cross sectional view of an exemplary communication device according to the present invention. In FIG. 3, the communication device may be fold-type device, such as a cellular telephone, and shows progress of light in an OFF state.

In FIG. 3, a communication device 270 may include a dual display mode liquid crystal display device 252 and a data entry device 260, such as a key pad. The dual display mode liquid crystal display device 252 may include first and second transparent electrodes 212 and 232 formed on inner surfaces of first and second substrates 210 and 230 facing each other, respectively. In addition, a TN mode liquid crystal layer 240 may be interposed between the first and second transparent electrodes 212 and 232. First and second polarizers 214 and 236 may be located on outer surfaces of the first and second substrates 210 and 230, and a selective reflection/transmission part 234 may be disposed between the second substrate 230 and the second polarizer 236.

In FIG. 3, a front light unit 250 may be disposed on an outer surface of the first polarizer 214, wherein the region toward the front light unit may be defined as a front side (a first display side) and the region opposite to the front side may be defined as a rear side (a second display side). The data entry device 260 may include an apparatus for inputting data, such as numbers and/or letters, into the communication device 270, and may be disposed toward the rear side.

In order to display a black image, when a voltage is not applied (OFF state) to the the first and second transparent electrodes 212 and 232, an amount of light may be reflected at the data entry device 260, thereby causing light leakage since the data entry device 260 does not perfectly absorb all the light. More particularly, in an OFF state, the light provided from the front light unit 250 or from outer light sources (not shown) may pass through the first polarizer 214, thereby transmitting first linearly polarized light. Then, the first linearly polarized light may be transformed into second linearly polarized light while passing through the liquid crystal layer 240, which may include molecules twisted at a right angle to the inner surfaces of the first and second substrates 210 and 230. Thus, the second linearly polarized light may be parallel to the light transmission axis of the second polarizer 236. Next, the second linearly polarized light may pass through the selective reflection/transmission part 234 and the second polarizer 236, thereby displaying a white image on the rear side. Conversely, an image having low black image brightness may be displayed on the front side since the light passing through the second polarzier 236 may not be perfectly blocked by the data entry device 260. Accordingly, a retardation film may be used.

Figure 4:
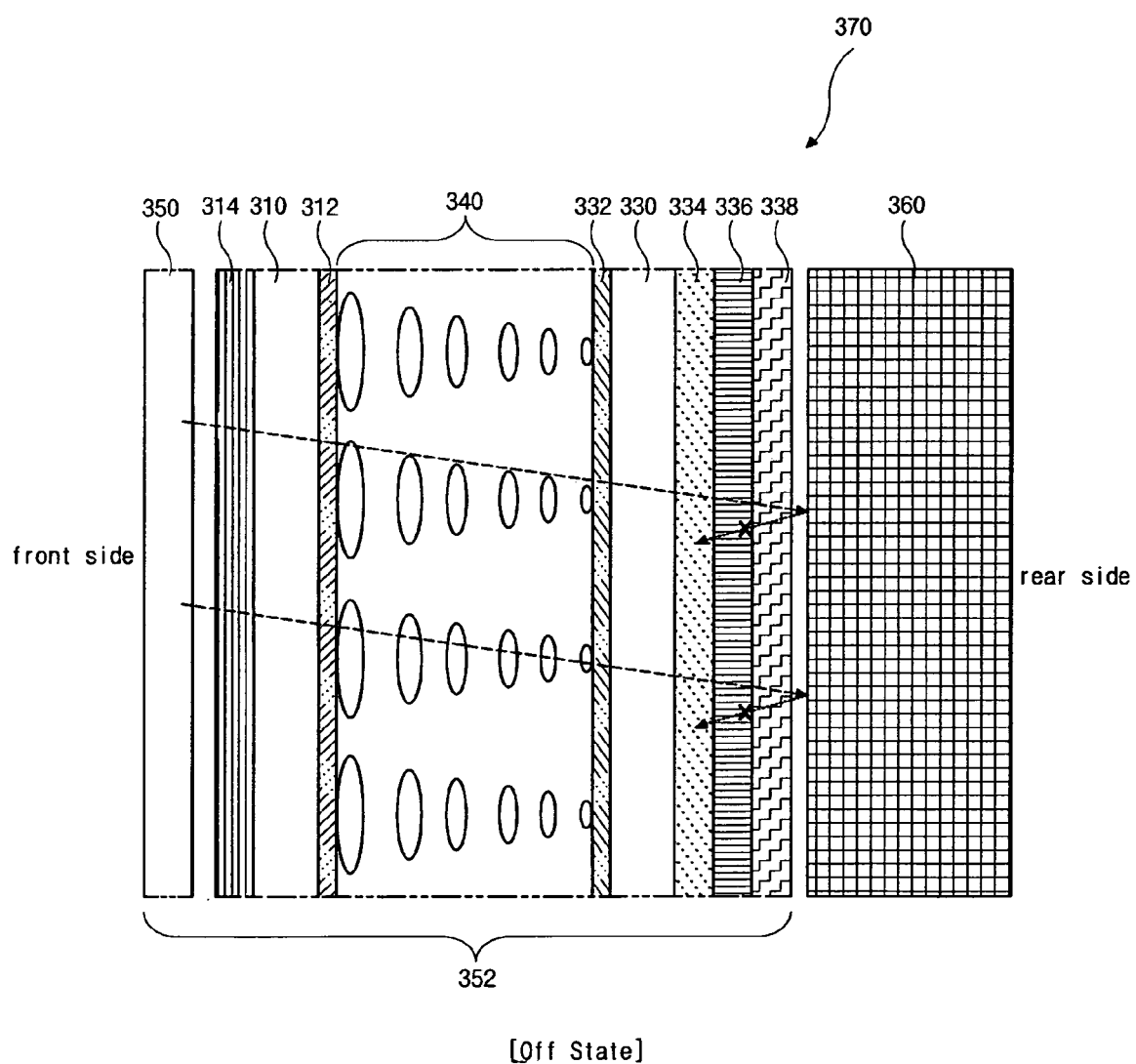
FIG. 4 is a schematic cross sectional view of another exemplary communication device according to the present invention.

FIG. 4 is a schematic cross sectional view of another exemplary communication device according to the present invention. In FIG. 4, the exemplary communication device makes use of a dual display mode liquid crystal display device, and shows progress of light in an OFF state.

In FIG. 4, a communication device 370, such as a cellular telephone, may include a dual display mode liquid crystal display device 352 and a data entry device 360, such as a key pad. The dual display mode liquid crystal display device 352 may include first and second substrates 310 and 330 facing each other, and first and second transparent electrodes 312 and 332 formed on inner surfaces of the first and second substrates 310 and 330, respectively. In addition, a liquid crystal layer 340 maybe interposed between the first and second transparent electrodes 312 and 332, first and second polarizers 314 and 336 may be disposed on outer surfaces of the first and second substrates 310 and 330, and a selective reflection/transmission part 334 may be disposed between the second substrate 330 and the second polarizer 336.

In FIG. 4, a front light unit 350 may be disposed on an outer surface of the first polarizer 314, and a retardation film 338 may be disposed on an outer surface of the second polarizer 336. Accordingly, the region toward the front light unit may be defined as a front side (a first display side) and the region opposite to the front side may be defined as a rear side (a second display side). Thus, the data entry device 360 may be disposed toward the rear side of the dual display mode liquid crystal display device 352, and the retardation film 338 may include a quarter wave plate (QWP) having a phase difference of about $\lambda/4$.

In an OFF state of the communication device 370, light produced by the front light unit 350 or from outer light sources (not shown) may pass through the first polarizer 314, thereby transmitting first linearly polarized light to the first substrate 310. Then, the first linearly polarized light may be transformed into second linearly polarized light while passing through the liquid crystal layer 340, which has molecules twisted at a right angle with respect to the inner surfaces of the first and second substrates 310 and 330. Accordingly, the second linearly polarized light may be parallel to the light transmission axis of the second polarizer 336. Then, the second linearly polarized light may pass through the selective reflection/transmission part 334 and the second polarizer 336, and may be transformed into first circularly polarized light by the retardation film 338. Next, the first circularly polarized light may be reflected by the data entry device 360 and may be transformed into second circularly polarized light, which may be symmetric to the first circularly polarized light along right- and left-hand sides. Then, the second circularly polarized light may be transformed into first linearly polarized light again through the retardation film 338, and blocked by the second polarizer 336. Thus, a black image may be displayed on the front side.

According to the present invention, a retardation film may be provided on the outer surface of the second display side to prevent a decrease in image quality due to the light being reflected at a data entry device when a black image is displayed on the front side. Specifically, the retardation film may compensate for the light reflected at the data entry device, and may effectively prevent the reflected light from arriving at the front side. Thus, black brightness at the rear side (reflective mode) may be increased to obtain a clear image having an improved contrast ratio.

Figure 5:
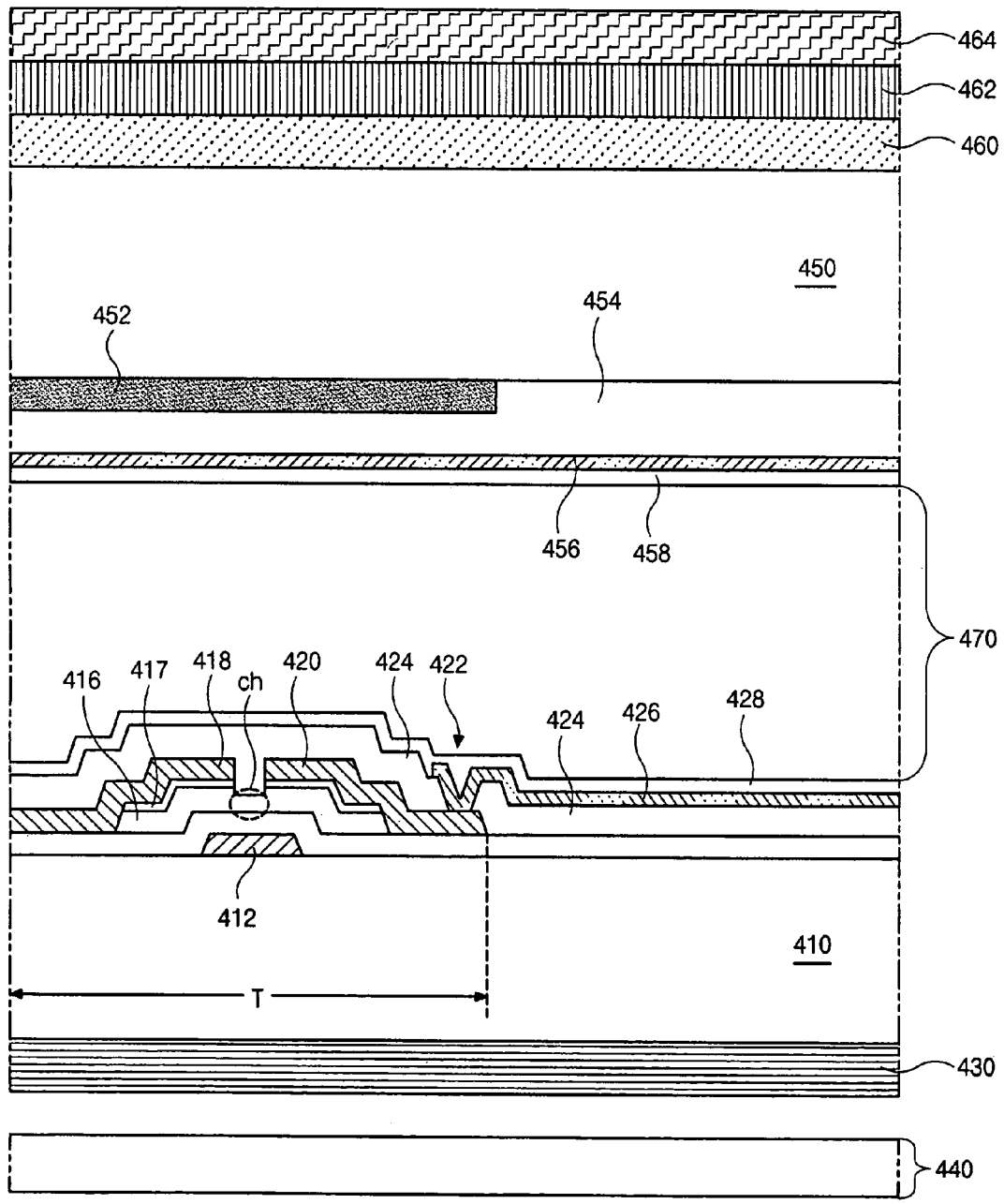
FIG. 5 is a schematic cross sectional view of another exemplary dual display mode liquid crystal display device according to the present invention.

FIG. 5 is a schematic cross sectional view of another exemplary dual display mode liquid crystal display device according to the present invention. For sake of brevity, a front light unit may be provided at the lower side of the liquid crystal display device. In FIG. 5, first and second substrates 410 and 450 may be spaced apart from and face each other. A thin film transistor T may be formed on an inner surface of the fist substrate 410, wherein the thin film transistor T may include a gate electrode 412, an active layer 416, a source electrode 418, and a drain electrode 420. In FIG. 5, a passivation layer 424 may be formed to cover the thin film transistor T, and may have a drain contact hole 422 that partially exposes the drain electrode 420. In addition, a pixel electrode 426 made of a transparent conductive material may be formed on the passivation layer 424 and may be connected to the drain electrode 420 through the drain contact hole 422. Moreover, a first alignment layer 428 may be formed on an entire surface of the substrate 410 to cover the pixel electrode 426.

The active layer 416 may include amorphous silicon, and an ohmic contact layer 417, which may include doped amorphous silicon, such as n+ a-Si, may be formed between the active layer 416 and the source and drain electrodes 418 and 420. In addition, the source and drain electrodes 418 and 420 may be spaced apart from each other, and a portion of the active layer 416 may be exposed between the source and drain electrodes 418 and 420 to form a channel ch.

In FIG. 5, a black matrix 452 may be formed on an inner surface of the second substrate 450 to cover the thin film transistor T, a color filter layer 454 may be formed on the black matrix 452, and a common electrode 456 may be formed on the color filter layer 454. The common electrode 456 may be made of the same material as the pixel electrode 426. In addition, a second alignment layer 458 may be formed on an entire surface of the second substrate 450 to cover the common electrode 456.

As shown in FIG. 5, a liquid crystal layer 470 may be interposed between the first and second alignment layers 428 and 458, thereby forming an initial arrangement of molecules of the liquid crystal layer 470. The pixel electrode 426 may correspond to the first transparent electrode 212 and 312, as shown in FIGS. 3 and 4, and the common electrode 456 may correspond to the second transparent electrode 232 and 332, in FIGS. 3 and 4. A first polarizer 430 may be disposed on an outer surface of the first substrate 410, and a front light unit 440 may be disposed on an outer surface of the first polarizer 430. In addition, a selective reflection/transmission part 460, a second polarizer 460, and a retardation film 464 may be sequentially disposed on an outer surface of the second substrate 450.

Figure 6:
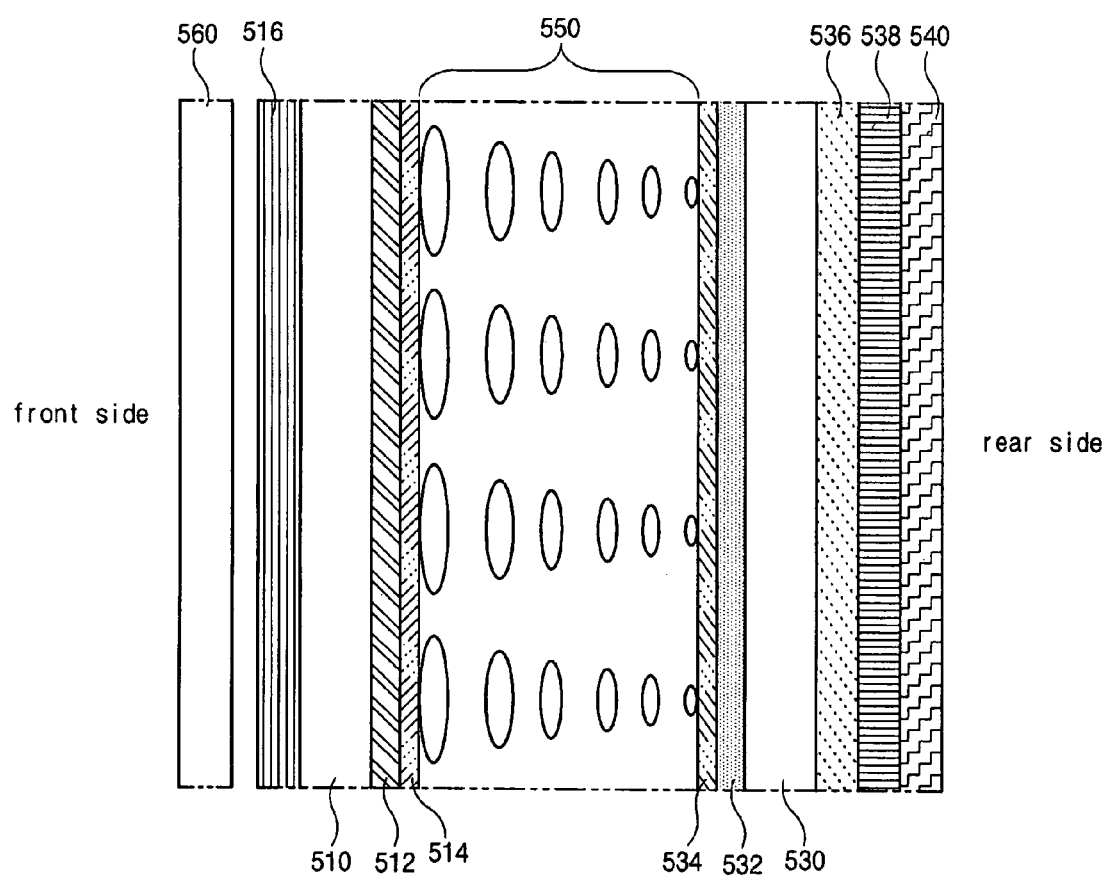
FIG. 6 is a schematic cross sectional view of another exemplary dual display mode liquid crystal display device according the present invention.

FIG. 6 is a schematic cross sectional view of another exemplary dual display mode liquid crystal display device according the present invention. In FIG. 6, a color filter element may be formed on the same substrate as a selective reflection/transmission part.

In FIG. 6, dual display mode liquid crystal display device may include first and second substrates 510 and 530 spaced apart from and face each other. In addition, an array element 512 may be formed on an inner surface of the first substrate 510, and a first transparent electrode 514 may be formed to cover the array element 512. Although not shown, the array element 512 may include a gate line, a data line, and a thin film transistor at a crossing of the gate and data lines. In FIG. 6, the first transparent electrode 514 may correspond to a pixel electrode, and the array element 512 and the first transparent electrode 514 may have a layered structure, as shown in FIG. 5, for example.

A color filter element 532 may be formed on an inner surface of the second substrate 530, and a second transparent electrode 534 may be formed to cover the color filter element 532. Although not shown, the color filter element 532 may include a color filter layer composed of three sub-color filters of red, green, and blue, and a black matrix may be disposed between the sub-color filters. In addition, the second transparent electrode 534 may correspond to a common electrode.

In FIG. 6, a liquid crystal layer 550 may be interposed between the first and second transparent electrodes 514 and 534, a first polarizer 516 may be disposed on an outer surface of the first substrate 510, and a front light unit 560 may be provided on an outer surface of the first polarizer 516. In addition, a selective reflection/transmission part 536 and a second polarizer 538 may be sequentially disposed on an outer surface of the second substrate 530. According to the present invention, the liquid crystal display device may be used in the communication device of FIG. 4, and a retardation film 540 may be disposed on an outer surface of the second polarizer 538. The region toward the front light unit 560 may be defined as a front side (a first display side) and the region opposite to the front side may be defined as a rear side (a second display side).

Figure 7:
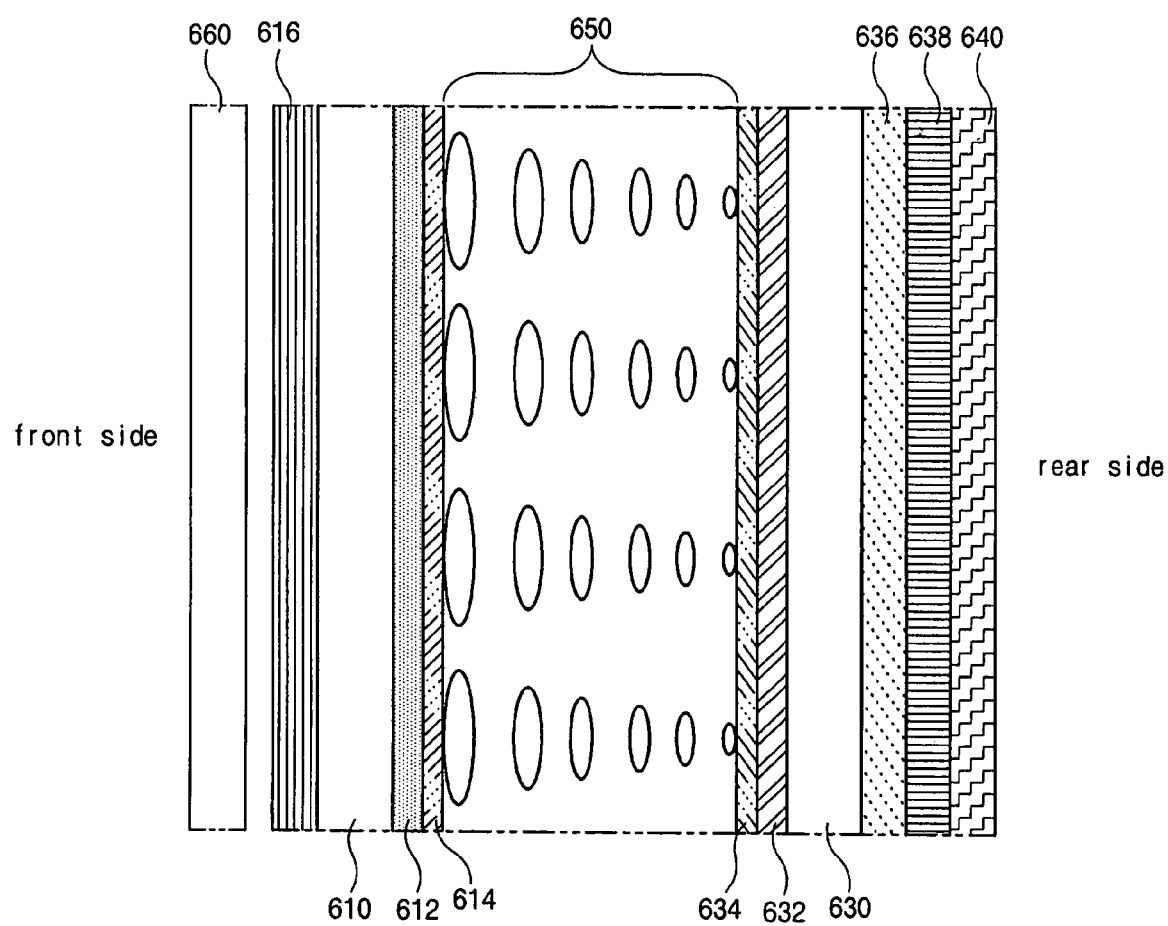
FIG. 7 is a schematic cross sectional view of another exemplary dual display mode liquid crystal display device according to the present invention.

FIG. 7 is a schematic cross sectional view of another exemplary dual display mode liquid crystal display device according to the present invention. In FIG. 7, an array element may be formed on the same substrate as a selective reflection/transmission part, and may have the same layered structure as shown in FIG. 6.

In FIG. 7, a dual display mode liquid crystal display device may include first and second substrates 610 and 630 spaced apart from and face each other. In addition, a color filter element 612 may be formed on an inner surface of the first substrate 610, and a first transparent electrode 614 may be formed to cover the color filter element 612. An array element 632 may be formed on an inner surface of the second substrate 630, and a second transparent electrode 634 may be formed to cover the array element 632. Accordingly, the first transparent electrode 614 may correspond to a common electrode and the second transparent electrode 634 may correspond to a pixel electrode.

As shown in FIG. 7, a liquid crystal layer 650 may be interposed between the first and second transparent electrodes 614 and 634, a first polarizer 616 may be disposed on an outer surface of the first substrate 610, and a front light unit 660 may be disposed on an outer surface of the first polarizer 616. In addition, a selective reflection/transmission part 636 and a second polarizer 638 may be sequentially disposed on an outer surface of the second substrate 630. According to the present invention, the liquid crystal display device may be used in the communication device of FIG. 4, and a retardation film 640 may be disposed on an outer surface of the second polarizer 638. The region toward the front light unit 660 may be defined as a front side (a first display side) and the region opposite to the front side may be defined as a rear side (a second display side).

According to the present invention, a dual display mode liquid crystal display device may further include a retardation film, and may be used in other semiconductor devices in addition to communication devices. Thus the liquid crystal display device may make use of both sides to display images, and conversions between the reflective mode and the transmissive mode may be freely made. Since the liquid crystal display device may make use a front light unit and outer light sources, the liquid crystal display device may not be limited by ambient light, thereby minimizing power consumption. The black brightness of the reflective mode may be improved due to the retardation film being disposed on the outer surface of the liquid crystal display device, thereby improving contrast characteristics of the liquid crystal display device.

It will be apparent to those skilled in the art that various modifications and variations can be made in the dual display mode liquid crystal display device, the communication device using a dual display mode liquid crystal display device, and the method of fabricating a liquid crystal display device of the present invention without departing from the spirit or scope of the inventions. Thus, it is intended that the present invention covers the modifications and variations of this invention provided they come within the scope of the appended claims and their equivalents.

What is claimed is:

1. A dual display mode liquid crystal display device, comprising:
   first and second substrates spaced apart from and facing each other;
   a first transparent electrode on an inner surface of the first substrate;
   a second transparent electrode on an inner surface of the second substrate;
   a liquid crystal layer between the first and second transparent electrodes;
   a first polarizer on an outer surface of the first substrate, the first polarizer having a first light transmission axis;
   a front light unit on an outer surface of the first polarizer;
   a single selective reflection/transmission part, the single selective reflection/transmission part selectively reflecting linearly polarized light corresponding to the first light transmission axis; and
   a second polarizer on an outer surface of the selective reflection/transmission part.

2. The device according to claim 1, wherein a region where the front light unit is situated functions as a reflective mode to display a normally-white mode, and an opposite region to the first display side functions as a transmissive mode to display a normally-black mode.

3. The device according to claim 1, wherein the front light unit includes a light transmittable material.

4. The device according to claim 1, wherein the second polarizer has a second light transmission axis perpendicular to the first light transmission axis.

5. The device according to claim 1, wherein the selective reflection/transmission part includes a double brightness enhancement film.

6. The device according to claim 1, wherein the liquid crystal layer includes a twisted nematic (TN) mode.

7. The device according to claim 1, further comprising a thin film transistor connected to the first transparent electrode.

8. The device according to claim 7, wherein the second transparent electrode is formed on an entire surface of the second substrate.

9. The device according to claim 1, further comprising:
   an array element including a thin film transistor between the first substrate and the first transparent electrode; and
   a color filter element between the second substrate and the second transparent electrode.

10. The device according to claim 9, further comprising a retardation film on an outer surface of the second polarizer.

11. The device according to claim 10, wherein the retardation film has a phase difference of about $\lambda/4$.

12. The device according to claim 1, further comprising:
    a color filter element between the first substrate and the first transparent electrode; and
    an array element including a thin film transistor between the second substrate and the second transparent electrode.

13. The device according to claim 12, further comprising a retardation film on an outer surface of the second polarizer.

14. The device according to claim 13, wherein the retardation film has a phase difference of about $\lambda/4$.

15. A communication device, comprising:
    first and second substrates spaced apart from and facing each other;
    a first transparent electrode on an inner surface of the first substrate;
    a second transparent electrode on an inner surface of the second substrate;
    a liquid crystal layer between the first and second transparent electrodes;
    a first polarizer on an outer surface of the first substrate, the first polarizer having a first light transmission axis;
    a front light unit on an outer surface of the first polarizer;
    a single selective reflection/transmission part, the single selective reflection/transmission part selectively reflecting linearly polarized light corresponding to the first light transmission axis;
    a second polarizer on an outer surface of the selective reflection/transmission part; and
    a data entry device adjacent to a second polarizer for inputting data.

16. The communication device according to claim 15, wherein the data entry device includes a key pad, and the data includes at least one of numbers and letters.

17. The communication device according to claim 15, further comprising a retardation film between the second polarizer and the data entry device.

18. The communication device according to claim 17, wherein the retardation film has a phase difference of about $\lambda/4$.

19. The communication device according to claim 18, wherein the liquid crystal layer includes a twisted nematic mode.

20. The communication device according to claim 18, wherein light provided from one of the front light unit and outer light sources passes through the first polarizer and is transformed into first linearly polarized light.

21. The communication device according to claim 20, wherein the first linearly polarized light is transformed into a second linearly polarized light while passing the liquid crystal layer.

22. The communication device according to claim 21, wherein the second linearly polarized light is perpendicular to the first linearly polarized light.

23. The communication device according to claim 22, wherein the second linearly polarized light passes through a selective reflection/transmission part and is transformed into a first circularly polarized light by the retardation film.

24. The communication device according to claim 23, wherein the first circularly polarized light is reflected at the data entry device and transformed into a second circularly polarized light that is symmetric to the first circularly polarized light.

25. The communication device according to claim 24, wherein the second circularly polarized light is transformed into first linearly polarized light through the retardation film.

26. The communication device according to claim 25, wherein the first linearly polarized light is blocked by the second polarizer.

27. A method of fabricating a liquid crystal display device, comprising:
   forming a first transparent electrode on an inner surface of a first substrate;
   forming a second transparent electrode on an inner surface of a second substrate, the second substrate facing the first substrate;
   providing a liquid crystal layer between the first and second transparent electrodes;
   forming a first polarizer on an outer surface of the first substrate, the first polarizer having a first light transmission axis;
   providing a front light unit at an outer surface of the first polarizer;
   forming a single selective reflection/transmission part, the single selective reflection/transmission part selectively reflecting linearly polarized light corresponding to the first light transmission axis; and
   forming a second polarizer on an outer surface of the selective reflection/transmission part.

28. The method according to claim 27, wherein a region where the front light unit is situated functions as a reflective mode to display a normally-white mode, and an opposite region to the first display side functions as a transmissive mode to display a normally-black mode.

29. The method according to claim 27, wherein the front light unit includes a light transmittable material.

30. The method according to claim 27, wherein the second polarizer has a second light transmission axis perpendicular to the first light transmission axis.

31. The method according to claim 27, wherein the selective reflection/transmission part includes a double brightness enhancement film.

32. The method according to claim 27, wherein the liquid crystal layer includes a twisted nematic (TN) mode.

33. The method according to claim 27, further comprising providing a thin film transistor connected to the first transparent electrode.

34. The method according to claim 33, wherein the second transparent electrode is formed on an entire surface of the second substrate.

35. The method according to claim 27, further comprising:
   providing an array element including a thin film transistor between the first substrate and the first transparent electrode; and
   providing a color filter element between the second substrate and the second transparent electrode.

36. The method according to claim 35, further comprising providing a retardation film on an outer surface of the second polarizer.

37. The method according to claim 36, wherein the retardation film has a phase difference of about $\lambda/4$.

38. The method according to claim 27, further comprising:
   providing a color filter element between the first substrate and the first transparent electrode; and
   providing an array element including a thin film transistor between the second substrate and the second transparent electrode.

39. The method according to claim 38, further comprising providing a retardation film on an outer surface of the second polarizer.

40. The method according to claim 39, wherein the retardation film has a phase difference of about $\lambda/4$.

41. The method according to claim 37, further comprising providing a data entry device adjacent to a second polarizer for inputting data.

42. The method according to claim 41, wherein the data entry device includes a key pad, and the data includes at least one of numbers and letters.

* * * * *